(12) United States Patent
Suzuki

(10) Patent No.: US 6,168,281 B1
(45) Date of Patent: Jan. 2, 2001

(54) TRANSPARENT AND SPREAD ILLUMINATING APPARATUS

(75) Inventor: Shingo Suzuki, Asaba-cho (JP)

(73) Assignee: Minebea Co., Ltd., Nagano-ken (JP)

( * ) Notice: Under 35 U.S.C. 154(b), the term of this patent shall be extended for 0 days.

(21) Appl. No.: 09/204,550

(22) Filed: Dec. 3, 1998

(30) Foreign Application Priority Data

Dec. 17, 1997 (JP) .................................................. 9-347648

(51) Int. Cl.[7] .............................. F21V 8/00; G02F 1/1335
(52) U.S. Cl. .......................... 362/31; 362/330; 362/561; 349/63
(58) Field of Search .................................. 362/26, 27, 31, 362/330, 295, 561; 349/62, 63, 65

(56) References Cited

U.S. PATENT DOCUMENTS

| 4,365,869 | * | 12/1982 | Hareng et al. | 349/63 |
| 5,280,415 | * | 1/1994 | Barnette | 362/31 |
| 5,339,179 | | 8/1994 | Rudisill et al. | 349/65 |
| 5,575,549 | * | 11/1996 | Ishikawa et al. | 362/31 |
| 5,608,550 | * | 3/1997 | Epstein et al. | 349/63 |

FOREIGN PATENT DOCUMENTS 7 333443 12/1995 (JP).
8 146231 6/1996 (JP).

* cited by examiner

*Primary Examiner*—Alan Cariaso
(74) *Attorney, Agent, or Firm*—Oliff & Berridge, PLC

(57) ABSTRACT

In a transparent and sheet-shaped lighting apparatus 1 disposed so as to cover a surface F of a member to be illuminated 51, a light source lamp 4 is disposed along a side end surface 3 of a transparent substrate 2 made of a translucent material, and a plurality of grooves 11 which are substantially triangular in section are formed in parallel with an axial direction of the light source lamp 4 are formed. In this structure, since the amount of light caused by the reflection on the grooves 11 and the amount of light depending on a distance from the light source lamp 4 become equal to each other on the entire back surface 8 of the transparent substrate 2, the light emitted from the light source lamp 4 progresses in the transparent substrate 2 and also goes out from the back surface 8 to enter the member to be illuminated 51, thereby to illuminate a screen.

8 Claims, 6 Drawing Sheets

TRANSPARENT AND SPREAD ILLUMINATING APPARATUS

BACKGROUND OF THE INVENTION

1. Field of Invention

The present invention relates to a transparent and spread illuminating apparatus which is integrated with a display unit used as a front-face illuminating means of a variety of reflection type display units, and more particularly to a transparent and spread illuminating apparatus used as a front-surface illuminating means for a reflection type liquid-crystal display unit.

2. Background of Related Art

A liquid-crystal display unit operable with a low power consumption has been demanded increasingly for display units mainly applied to computers since it is thin in configuration, light in weight and so on. Because liquid crystal which is a structural element of the liquid-crystal display unit emits no light by itself, an illuminating means for illuminating an image is required, which is different from a light emission type device such as a CRT. In particular, in the circumstances where a demand of a fine and colored image in high level is increased recently, a structure in which a liquid-crystal display unit is backed with a high luminance spread light source is usually used. However, since in order to illuminate the spread light source, an excessive electric power is required, there occurs such a problem that the feature of liquid crystal having a low electric power consumption is lessened.

In particular, a portable liquid-crystal device frequently used with the advantages of the liquid-crystal display unit thin in configuration and light in weight has a drawback that the consumption of an internal electric power becomes increased due to the illumination of the spread light source which is provided in the liquid-crystal display unit to remarkably shorten a period of illuminating time for using it as the portable device.

In order to solve the above problem, there has been developed a reflection type liquid-crystal device that may operate by employing ambient light as an illuminating means even if no spread light source is provided.

An example of the most basic structure of the reflection type liquid-crystal device is shown in FIG. 10. A reflection type liquid-crystal display device 51 is designed in such a manner that transparent electrodes 53a and 53b are formed on opposite surfaces of a pair of glass substrates 52a and 52b, respectively, the transparent electrode 53b on a back surface B side (a lower side in FIG. 10) is patterned, and switching elements 54 are connected to the patterned transparent electrode 53b, respectively, to display a desired image.

Moreover, a space between the transparent electrodes 53a and 53b is filled with a liquid-crystal material 55. Also, a color filter 56 is disposed between the glass electrode 52a and the transparent electrode 53a which are on a side of an observation face F (an upper side in FIG. 10). Polarizing plates 57a and 57b are disposed on the other surfaces of the glass substrate 52a and 52b where no transparent electrodes 53a and 53b are provided, respectively. In addition, there is provided a high-efficiency reflector 58 that covers the polarizing plate 57b on the back surface B side.

In the reflection type liquid-crystal device 51 thus structured, by reflecting incident light to the reflector 58 disposed on the back surface B from the surroundings, a screen is brightly irradiated to enable to observe an image.

In the reflection type liquid-crystal device 51 thus structured, since the incident light to the reflector 58 disposed on the back surface B from the surroundings is reflected so as to be irradiated onto a screen, its display quality depends on the ambient brightness.

In particular, under the circumstance where the image is required to be high in quality, in the reflection type liquid-crystal devices of color display which are increased in demand, the reflection rate is generally lower than that of monochrome liquid crystal because of the provision of a color filter and the like, and therefore in the case where a brightness is not ensured in the surroundings and the luminance of the screen is insufficient, it becomes necessary to provide an auxiliary illumination for increasing the amount of an incident light to the reflector 58 in order to observe the image. The auxiliary illumination may be a table lamp or the like. However, it is troublesome always carry the illuminating apparatus to use it as the auxiliary illumination and the color-display reflection type liquid-crystal device cannot be used in the environment where the amount of the incident light to the reflector 58 is insufficient, resulting in a great loss of the advantages of the portable device.

SUMMARY OF THE INVENTION

The present invention has been made to solve the above problems, and therefore an object of the present invention is to provide a transparent and spread illuminating apparatus which is structured to be integrated with a reflection type liquid-crystal display device, thereby being capable of being used without requiring the auxiliary lighting and also without being influenced by the brightness of surroundings, and further being easy to carry it low in electric power consumption.

In order to solve the above problems, according to a first aspect of the present invention, there is provided an illuminating apparatus disposed closely to a member to be illuminated so as to cover a front surface of the member to be illuminated, characterized in that a light source lamp is disposed closely along at least one side end surface of a transparent substrate made of a translucent material, a large number of grooves which are substantially triangular in section are formed in parallel with an axial direction of said light source lamp to provide a light reflection pattern consisting of said grooves and flat portions, and said grooves are defined in such a manner that the combined amount of light being caused by the reflection at said grooves and depending on a distance from said light source lamp become identical everywhere on the back surface of said transparent substrate.

According to a second aspect of the present invention, there is provided an illuminating apparatus characterized in that said member to be illuminated comprises a reflection type liquid-crystal display device.

According to a third aspect of the present invention, there is provided an illuminating apparatus characterized in that said light reflection pattern is formed in such a manner that the ratio in width of said grooves and said flat portions becomes larger as said grooves are separated from the light source lamp in the case where the depth of the respective grooves is constant, and the depth of the grooves becomes deeper as the grooves are apart from the light source lamp in the case where the widths of the flat portions are constant, or the light reflection pattern is formed by the combining the above with each other.

According to a fourth aspect of the present invention, there is provided an illuminating apparatus characterized in that said light reflection pattern is formed in such a manner that the width of said grooves is 1.5 times as large as the width of said flat portions, or less.

According to a fifth aspect of the present invention, there is provided an illuminating apparatus characterized in that said grooves are formed in such a manner that an angle of inclination of one inclined face of the grooves which is closer to the light source lamp is set at 35° to 55° and an angle of inclination of the other inclined face of the grooves which is opposite to said one inclined face is set at 60° to 90°.

According to a sixth aspect of the present invention, there is provided an illuminating apparatus characterized in that said grooves are formed in such a manner that the angles of valley portions which correspond to the angles of the apex of the grooves which are triangular in section are constant.

According to a seventh aspect of the present invention, there is provided an illuminating apparatus characterized in that the intensity of light emission from said light source lamp is adjustable.

BRIEF DESCRIPTION OF THE DRAWINGS

These and other objects, features and advantages of this invention will become more fully apparent from the following detailed description taken with the accompanying drawings in which.

DETAILED DESCRIPTION OF PREFERRED EMBODIMENTS

Now, an explanation will be given in more detail of preferred embodiments of the present invention with reference to the accompanying drawings.

Figure 1:
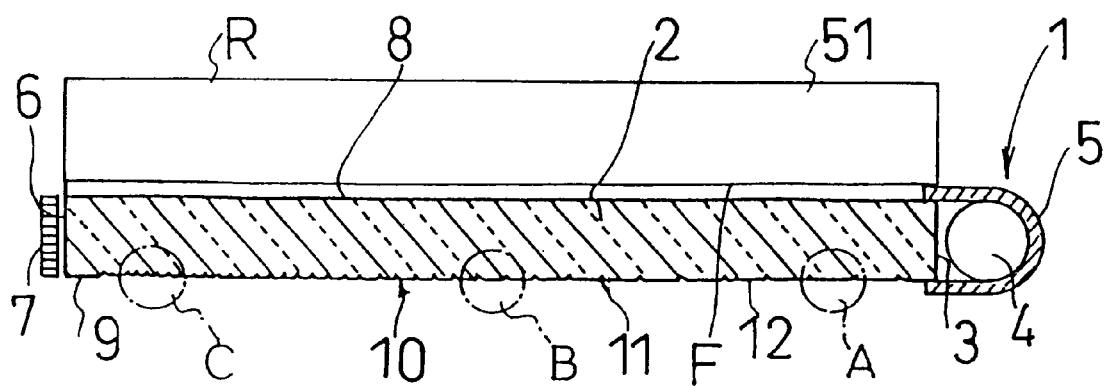
FIG. 1 is a cross-sectional view showing the structure of a transparent and spread illuminating apparatus in accordance with the present invention.

A transparent and spread illuminating apparatus 1 in accordance with a first embodiment of the present invention will be described with reference to the accompanying drawings. As shown in FIG. 1, the transparent and spread illuminating apparatus 1 is disposed so as to cover an observation face F of a reflection type liquid-crystal device 51 described in FIG. 10. The transparent and spread illuminating apparatus 1 is structured in such a manner that a light source lamp 4 is disposed at a predetermined distance along one side end surface 3 of a transparent substrate 2 which is made of acrylic resin and substantially rectangular in section, and a lamp reflector 5 is also disposed so as to cover the light source lamp 4. Further, a reflector film 7 is disposed in close contact with the other side end surface 6 which is opposite to the one side end surface 3. An adhesive or the like may be used to surely fix the reflector film 7 onto the side end surface 6.

In the present embodiment, it is assumed that, in FIG. 1, one surface of the transparent substrate 2 which is faced to the reflection type liquid-crystal device 51 is referred to as a back surface 8, and its opposite surface (a lower side in FIG. 1) which is on an observation face (screen) side is referred to as a front surface 9.

On the front surface 9 of the transparent substrate 2, a light reflection pattern 10 is formed. The light reflection pattern 10 is made up of a large number of grooves 11 which are substantially triangular in section and a large number of flat portions 12 adjacent to the grooves 11.

Figure 2A:
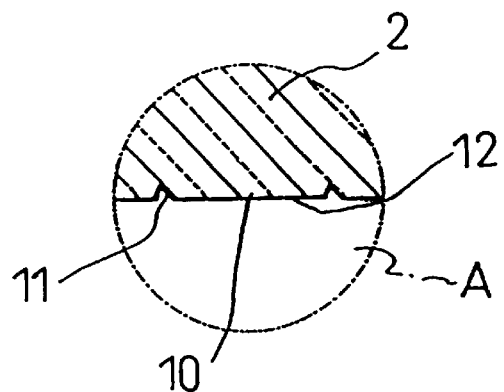
FIGS. 2A to 2C are enlarged views showing a light reflection pattern shown in FIG. 1, respectively.
Figure 2B:
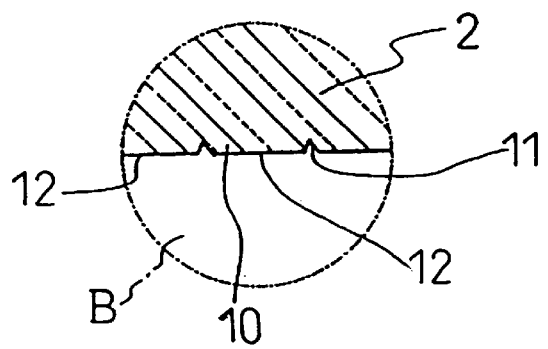
Figure 2C:
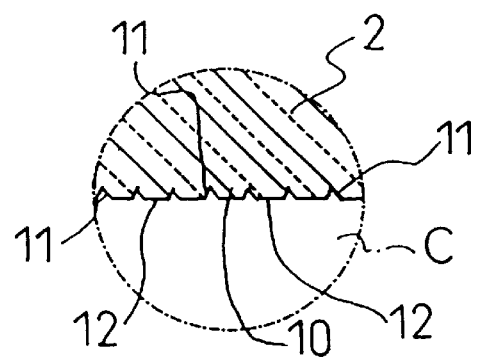

As shown in FIGS. 2A to 2C which are enlarged views of regions A, B and C circled by a dotted line in FIG. 1, respectively, intervals between the grooves 11 are different from each other in accordance with locations so that a light entering the observation face F of the reflection type liquid-crystal device 51 has uniform brightness without being influenced by a distance from the light source lamp 4. In other words, as shown in FIGS. 2A to 2C, a large number of grooves 11 are formed so as to be in parallel with the axial direction of the light source lamp 4 to make the depths of the grooves 11 constant. Also, the grooves 11 are formed such that the number of grooves 11 increases more and the width of the flat portions 12 is narrowed gradually as the grooves 11 are located far from the light source lamp 4 (toward left-side in FIG. 1).

Now, the light entering the reflection pattern 10 among the light emitted from the light source lamp 4 and entering the transparent substrate 2 is divided into the light reflected by the grooves 11 and the light reflected by the flat portions 12. Since most of the light reflected by the grooves 11 is small in angle of incidence to the back surface 8 of the transparent substrate 2, it is outgoing from the transparent substrate 2. On the other hand, since most of the light reflected by the flat portions 12 is large in angle of incident to the back surface 8, it is reflected by the back surface 8 to return to the interior of the transparent substrate 2. Therefore, the amount of light outgoing from the back surface 8 of the transparent substrate 2 increases more as the number of grooves 11 increases.

On the other hand, the light is great in luminance as it is close to the light source lamp 4, and the luminance is lowered in proportion to a distance from the light source lamp 4.

Therefore, the transparent and spread illuminating apparatus 1 of the present invention is formed in such a manner that the number of grooves 11 increases in proportion to the distance from the light source lamp 4, so that the light reflection pattern 10 is formed such that the amount of the light outgoing from the back surface 8 of the transparent substrate 2 which is formed by combining the amount of light caused by the reflection on the grooves 11 and depending on a distance from the light source lamp 4 becomes uniform anywhere on the back surface 8.

Hereinafter, in order to limit a sectional form of the groove 11, the progressing state of the light entering the light reflection pattern 10 will be described in more detail. In the present embodiment, it is assumed that a portion corresponding to a base of an triangle of the sectional groove 11 is a virtual plane S, an angle of inclination of the inclined face 13 of the triangle close to the light source lamp 4 (right side in FIG. 3) is α, and an angle of inclination of the inclined face 14 closer to the side end surface 6 (left side in FIG. 3) is β.

The angle of inclination a is determined so that the light 15 outgoing from the light source lamp 4 and progressing toward the inclined face 13 is totally reflected on the inclined face 13. The light 15 progresses toward the back surface 8 after being totally reflected on the inclined face 13, and goes out from the transparent substrate 2 because of a small angle of incidence. The angle of inclination α of the inclined face 13 is appropriately selected so that the outgoing direction of the light 15 is set to a direction in which a display becomes the brightest, taking the characteristic of the reflection surface of the reflection type liquid-crystal device 51 which is the member to be illuminated into consideration.

The direction in which the display becomes the brightest is generally the case where an incidence to the observation face F of the reflection type liquid-crystal device 51 is perpendicular to the display. Therefore, in order to make the light 15 progress perpendicularly to the observation face F of the reflection type liquid-crystal device 51, it has been proved through experiments that the angle of inclination α is set within a range of from about 35° to 55°. The optimum angle of inclination α must be appropriately selected for each of the grooves 11 since the angle of incidence of the light 15 to the inclined face 13 changes in accordance with the size of the transparent substrate 2 and the position of the respective grooves 11.

Figure 3:
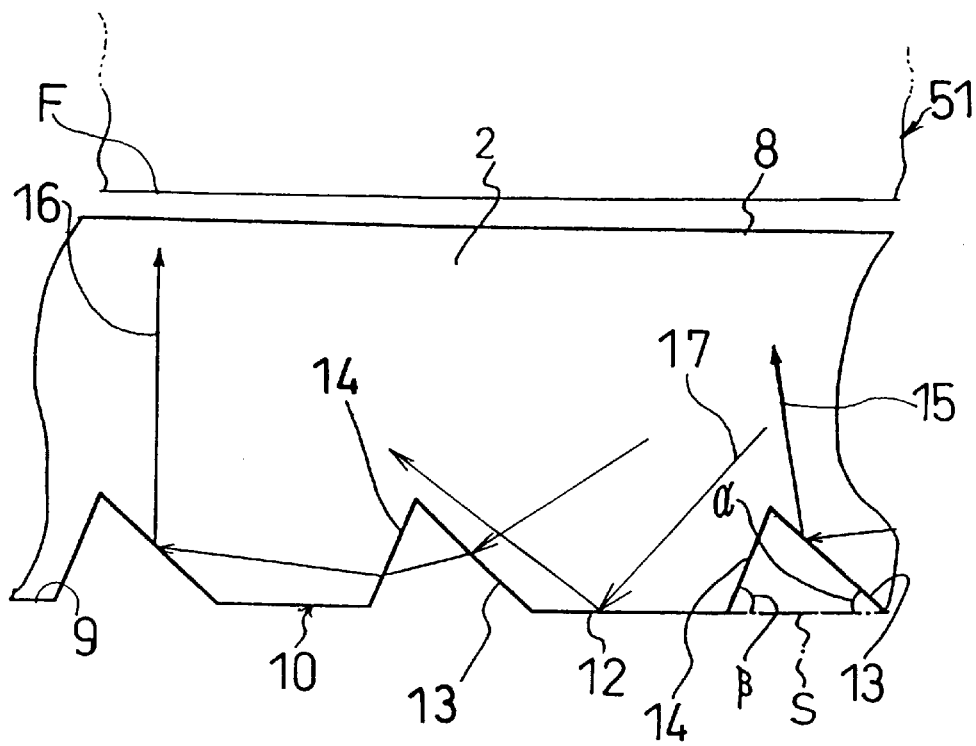
FIG. 3 is a schematic view for explanation of a light progressing state.

On the other hand, the angle of inclination β of the inclined face 14 is designed with taking into consideration a light 16 which is incident to the inclined face 13 of the side close to the light source lamp 4 at a critical angle or less, passes through the inclined face 13 and again progresses in the interior of the transparent substrate 2 from the inclined face 14. As shown in FIG. 3, the light 16 is incident to the inclined face 13 of the groove 11 at a critical angle or less, and most of the light passes through the inclined face 13 and is made outgoing from the transparent substrate 2 once. The angle of inclination β is set in such a manner that the light 16 outgoing from the transparent substrate 2 again enters the transparent substrate 2 and is further incident to the inclined face 13 of the adjacent groove 11. The light 16 again progresses in the interior of the transparent substrate 2, is totally reflected on the inclined face 13 of the groove 11, and then goes out from the back surface 8 of the transparent substrate 2. Also, although being omitted in the drawing, the light is made outgoing from the transparent substrate 2 after passing through the inclined face 13 depending on the entering position and the angle of incidence of the light to the inclined face 13.

An experiment proves that the angle of inclination is set within a range of from about 60° to 90° in order to realize the above progressing path of the light 16. However, the angle of inclination must be appropriately set for each of the grooves 11 because their optimum configurations are different depending on the positions of the respective grooves 11 similarly as the above-mentioned angle of inclination α, and is also set with taking the value of the angle of inclination α into consideration.

Also, a light 17 entering the flat portion 12 is totally reflected on the flat portion 12 and progresses toward the back surface 8 side. Further, the light 17 is totally reflected on the front surface 9 and again progresses toward the back surface 8 side. Then, in the case where the light 17 arrives at the groove 11, the light 17 is totally reflected on the inclined face 13 as described above and finally goes out through the back surface 8. On the other hand, in the case where the light 17 arrives at the flat portion 12, the light 17 is totally reflected on the flat portion 12 and also progresses in the interior of the transparent substrate 2 while being separated from the light source lamp 4 and totally reflected on the back surface 8.

Accordingly, in the case where the width of the flat portion 12 is large, the amount of light progressing in the transparent substrate 2 becomes large, and the amount of light outgoing through the back surface 8 becomes small.

In other words, by forming the width of the flat portion 12 relatively largely at a portion close to the light source lamp 4 where the amount of light is large, the ratio of the light progressing in the transparent substrate 2 is increased, thereby the amount of light outgoing from the back surface 8 is reduced close to that portion. On the other hand, in the vicinity of the side end surface 6 that is far from the light source lamp 4, because the amount of light from the light source lamp 4 becomes small, the width of the flat portion 12 is reduced to increase the amount of light outgoing from the back surface 8. In this way, by forming thus the light reflection pattern 10, the amount of light outgoing from the back surface 8 can be made uniform.

Since the light can be made to progress in desired directions by setting the angle of inclination α, the angle of inclination β and the width of the flat portions 12 as described above, the amount of light outgoing through the back surface 8 becomes uniform without being influenced by a distance from the light source lamp 4. Therefore, the observation face F of the reflection type liquid-crystal device 51 can be illuminated by the light with uniform brightness. Further, because the amount of light emitted through the surface 9 of the transparent substrate 2 is very slight, nearly all of the light entering the transparent substrate 2 emits from the back surface 8 in order to lighten the reflection type liquid-crystal device 51, thereby enabling to illuminate it with a high efficiency.

Figure 4:
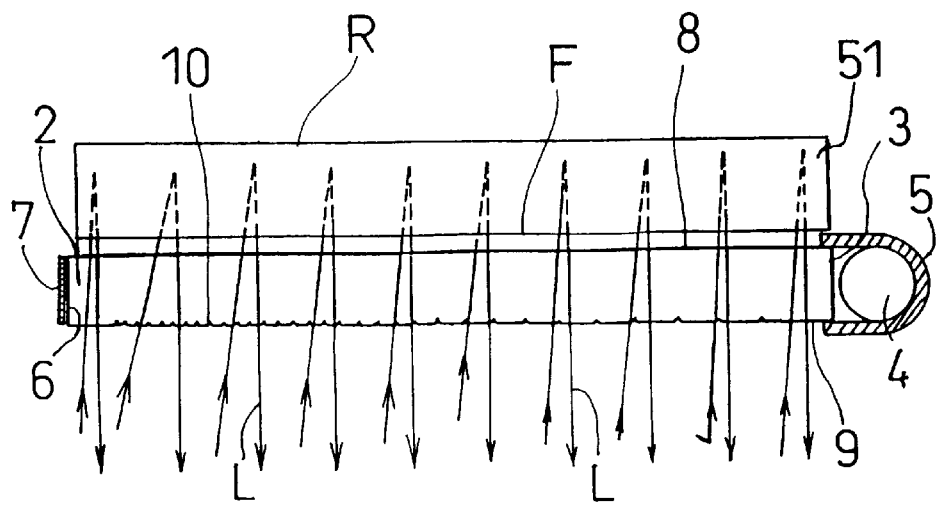
FIG. 4 is a schematic view for showing an ambient-light progressing state.

FIG. 4 schematically shows the progressing path of ambient light L when the transparent and spread illuminating apparatus 1 of the present invention is disposed on the reflection type liquid-crystal display device 51.

Although the light reflection pattern 10 is formed on the front surface 9 of the transparent substrate 2, because the area of the flat portions 12 is larger than that of the grooves 11, this arrangement may be deemed equivalent to an arrangement in which a transparent flat plate is disposed on the observation face F of the reflection type liquid-crystal display device 51. Therefore, the progressing state of the ambient light L can be considered to be the same as in the case where the light passes through the transparent flat plate on which the light reflection pattern 10 is not formed. Hence, the transparent and spread illuminating apparatus 1 of the present invention does not impede that the ambient light is irradiated onto the observation face F with the reflector 58 (refer to FIG. 10) equipped in the reflection type liquid-crystal device 51. Therefore, in case of the reflection type liquid-crystal display device 51 having the transparent and spread illuminating apparatus 1 of the present invention, the display can be observed even in a state where the light source lamp 4 is turned off when the surroundings are bright, that is, and the ambient light L is sufficient. Further, in the case of taking the progressing state of the ambient light L into consideration, it has been proved through experiments that the width of the grooves 11 is set to be 1.5 times as large as the width of the flat portion 12, or less, in order to make the transparent substrate 2 having the light reflection pattern 10 play the same effect as the transparent plate on which the light reflection pattern is not formed.

Further, in the transparent and spread illuminating apparatus 1 of the present invention, the light emitted from the light source lamp 4 and the ambient light L can be used as the illuminating source of the reflection type liquid-crystal device 51. In this case, the intensity of the light emitted from the light source lamp 4 is adjusted in accordance with the intensity of the ambient light L, thereby being capable of obtaining an optimum illuminating environment, and also since the amount of light emitted from the light source lamp 4 can be reduced at the minimum as required, the electric power consumption can be remarkably reduced.

In the above-described transparent and spread illuminating apparatus 1 in accordance with the present invention, a process of forming the grooves 11 of the light reflection pattern 10 can be made by grinding due to a diamond turning tool. In this process, since the turning tool for machining is employed while being fixed, an angle of a valley corresponding to a vertical angle of the groove 11 which is substantially triangular in section becomes constant. For that reason, the sum of the angle of inclination α and the angle of inclination β are always kept constant. However, the angle of inclination a and the angle of inclination β are formed so as to be appropriately changed within a limit that a desired progressive state of the light can be obtained, thereby being capable of realizing the more efficient spread illumination.

Figure 5:
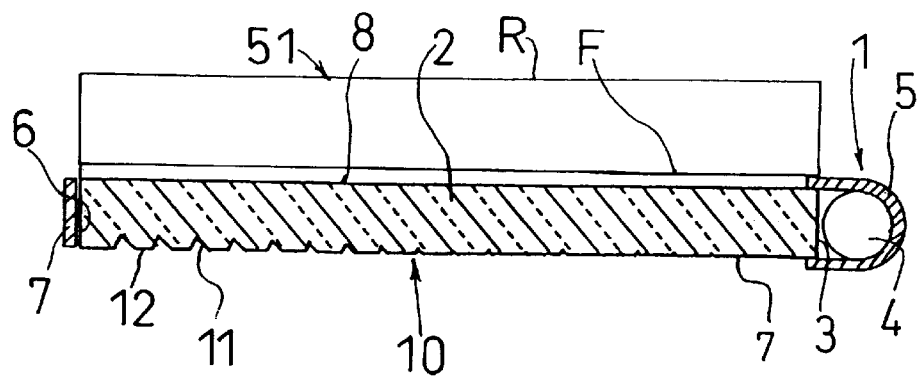
FIG. 5 is a cross-sectional view showing the structure of a transparent and spread illuminating apparatus different from that of FIG. 1.

Also, the light reflection pattern 10 may be formed in such a manner that the grooves 11 are disposed at given intervals, and also the size of the grooves 11 increases (that is, their width and depth) as the grooves 11 are separated from the light source lamp 4 as shown in FIG. 5. In this way, even in the case where there is provided the light reflection pattern 10 that changes in such a manner that the size of the grooves 11 increases gradually as the grooves 11 are separated from the light source lamp 4, there is substantially no change in the optical characteristic in comparison with the light reflection pattern 10 shown in FIG. 10. Therefore, taking various conditions such as machining property and so on into consideration, any one of those light reflection patterns may be appropriately selected. Also, two kinds of light reflection patterns 10 shown in FIGS. 1 and 5 may be appropriately combined together.

Figure 6:
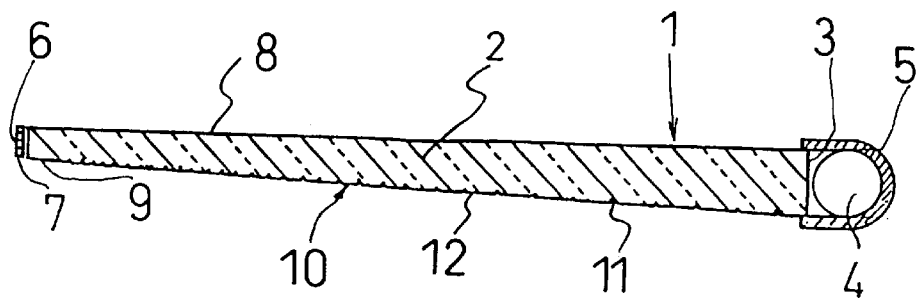
FIG. 6 is a cross-sectional view showing the structure of a transparent and spread illuminating apparatus different from that of FIG. 5.

Further, in order to reduce a weight of the apparatus, a transparent substrate 2' may be shaped substantially in a wedge in section such as the transparent and spread illuminating apparatus as shown in FIG. 6. Even in the wedge-shaped transparent substrate 2', the same function as the above mentioned one is obtained by forming the light reflection pattern 10 resulting from forming grooves 11 on the front surface 9 of the transparent substrate 2' so that the amount of light emitting from the back surface 8 becomes uniform similarly as the light reflection pattern 10 shown in FIGS. 1 or 5.

In manufacturing the transparent and spread illuminating apparatus 1 of the present invention, the transparent substrates 2 and 2' may be made of a material that allows the light to pass therethrough with a high efficiency, and is most preferably made of acrylic resin due to its transparency and workability in processing. However, in the implementation of the present invention, the material of the transparent substrates 2 and 2' is not limited to acrylic resin, and may be made of various thermoplastic transparent resin such as vinyl chloride resin, polycarbonate resin, olefin resin, styrene resin or the like. Also, thermosetting transparent resin such as epoxy resin or allyldiglycol carbonate resin, or inorganic transparent material such as various glass material may be applicable if there is demand.

In addition, when producing the transparent substrates 2 and 2' it can be carried out by machining resin material such as cutting or grinding, and in case of resin material, although, various molding methods such as extrusion molding, thermo-pressure molding or injection molding are applicable. The injection molding method using resin material is most excellent from the viewpoint of productivity.

Also, the lamp reflector 5 and the reflector film 7 which are structural members of the transparent and spread illuminating apparatus 1 of the present invention are not essential to the structure of the present invention, but are effective in prevention of the loss of the light to make the efficiency high. The lamp reflector 5 and the reflector film 7 may be generally formed of a film resulting from forming a thin film on the surface of a metal such as silver or aluminum, a film in which surface is coated in white, or a film mixed with a white pigment. Instead, a metal plate a surface of which is mirror-polished may be used.

Figure 10:
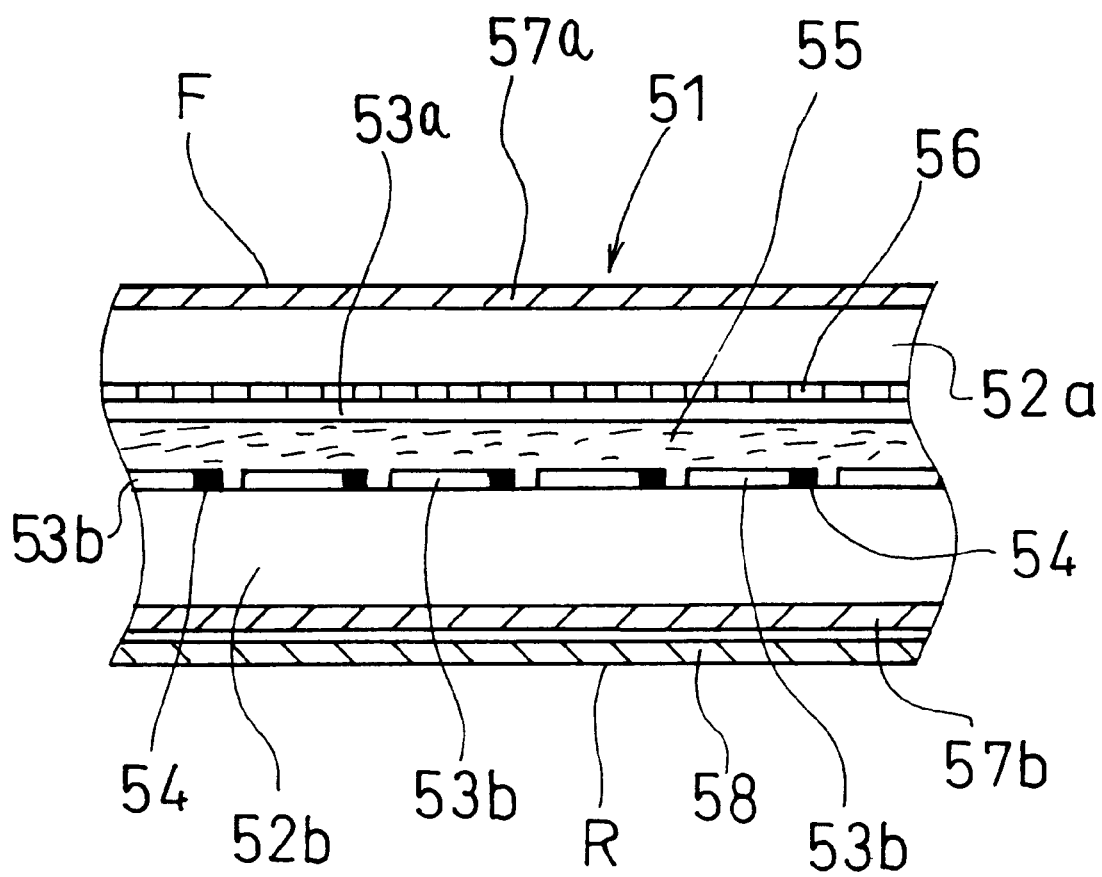
FIG. 10 is a cross-sectional view for explanation of the structure of a reflection type liquid-crystal device.

The reflection type liquid-crystal device 51 which is a member to be illuminated is structured as described with reference to FIG. 10, but the transparent and spread illuminating apparatus 1 of the present invention is not limited to that structure and applicable to various reflection type liquid-crystal devices employing the ambient light as illumination.

(Embodiment)

As Embodiment 1, the luminance of the reflection type liquid-crystal device 51 having the transparent and spread illuminating apparatus 1 of the present invention is measured.

The structure of the transparent and spread illuminating apparatus 1 is the same as that explained in FIG. 1, and the transparent substrate 2 is formed of a transparent flat plate made of acrylic resin the entire peripheral surface of which is polished (size: 240 mm×160 mm, thickness 3 mm), and the light source lamp 4 is disposed at one of longer sides of the transparent substrate 2 being used as the one side end surface 3. A cold cathode fluorescent tube φ2.3 mm in outer diameter is used as the light source lamp 4. Then, the light source lamp 4 is turned on by invertor with sine waves of tube current 3.5 mA and lightening frequency 60 KHz (electric power consumption: 1.5 W).

On the front surface 9 of the transparent substrate 2, the light reflection pattern 10 consisting of a large number of grooves 11 substantially triangular in section which are defined in parallel along the longer side of the front surface 9, and a large number of flat portions 12 is formed. In each of the grooves 11, a portion corresponding to an angle of the apex of the groove 11 which is triangular in section, that is, a valley portion is formed constantly at 60°, and the angle of inclination α is so set as to be continuously changed in a range of from 45° to 50° from the light source lamp 4 side toward the side end surface 6, in accordance with which the angle of inclination β is also changed. Then, the depth of the groove 11 is always set to 10 μm, and the pitches (distances between the respective adjacent two groove 11) are continuously changed in a range of from 0.45 to 0.05 mm from the light source lamp 4 toward the side end surface 6 side, to thereby change the relative ratio in width of the grooves 11 to the flat portions 12 in accordance with a distance from the light source lamp 4.

The lamp reflector 5 and the reflector film 7 are formed of a PET film on which silver is evaporated.

On a back surface of the transparent and spread illuminating apparatus 1 thus structured, the reflection type liquid-crystal device 51 which is substantially identical in size with the transparent substrate 2 is disposed. In this example, as a reflection type liquid-crystal device 51, what displays is monochromatic image is employed.

Figure 7:
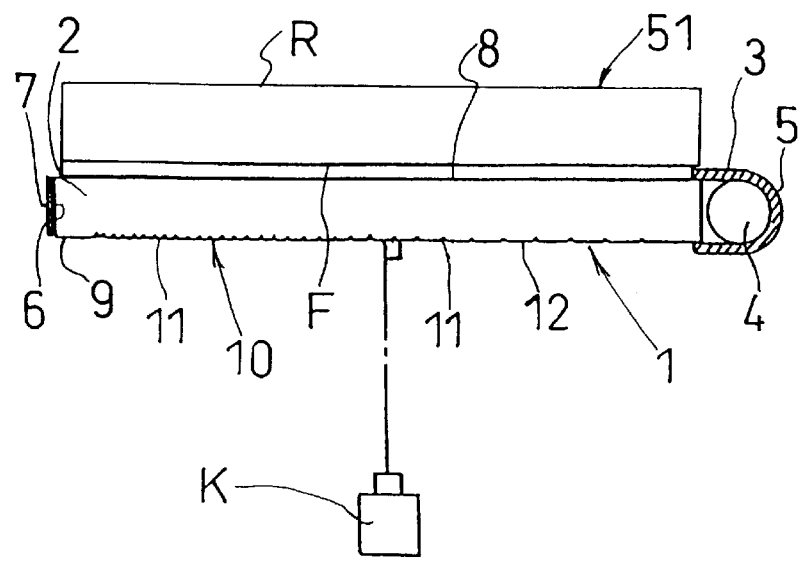
FIG. 7 is a schematic diagram for explanation of a luminance measuring method.

In the measurement of luminance, a luminance meter K (made by Topcon Corp., BM-7/the field of view 1°) is disposed at a position apart by 50 cm from the substantial center of the front surface of the transparent substrate 2 toward the front surface as shown in FIG. 7, and the luminance of a portion displayed in white was measured in a dark room where the intensity of an ambient light is 0.

The measurement result was 380 cd/m² and thus a very high luminance value could be obtained.

Then, luminance is measured in a state where the light source lamp 4 is turned off without any change in the position of the luminance meter K.

Figure 8:
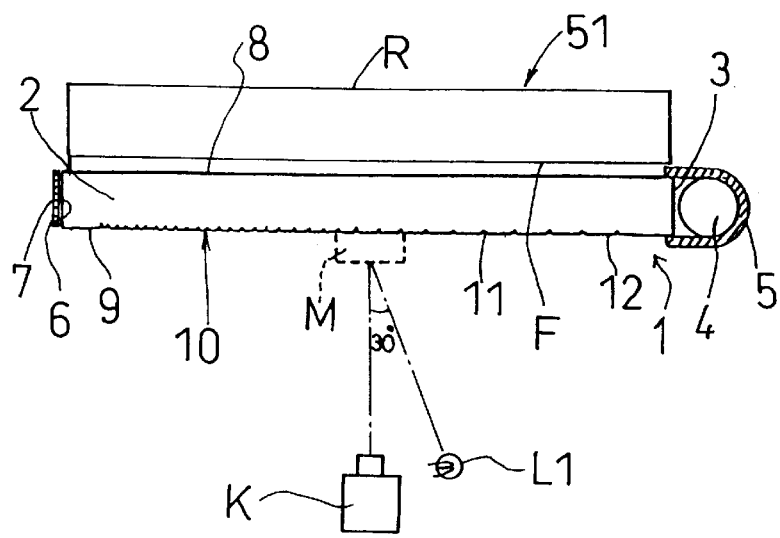
FIG. 8 is a schematic diagram for explanation of a luminance measuring method different from that of FIG. 7.

As shown in FIG. 8, a spot light source L1 is displaced at a position apart from a position by 30°, at which the luminance is measured by the luminance meter K, and the illumination of the front surface 9 was measured by an illuminometer M (made by Minolta Co., Ltd. T-1M) while changing the brightness of the spot light source L1. In addition, the luminance of a screen was measured by the luminance meter K in a state where the illuminometer M was removed.

Finally, for comparison, the transparent and spread illuminating apparatus 1 of the present invention was removed, and the same measurement was carried out with only the reflection type liquid-crystal display device 51.

Figure 9:
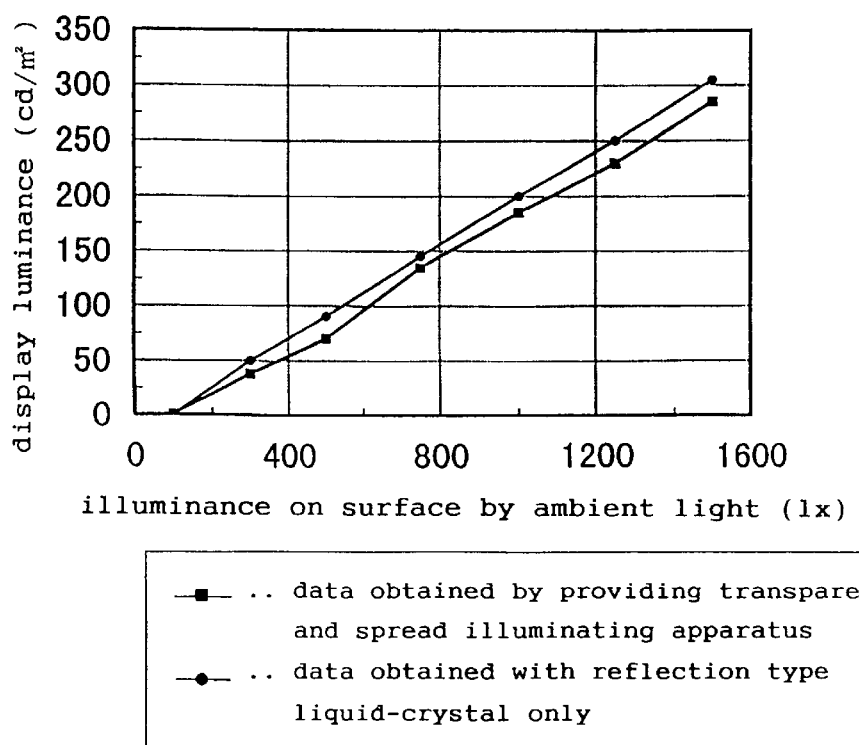
FIG. 9 is a table showing the luminance measurement results.

The measurement results are shown in FIG. 9. As is apparent from a table of FIG. 9, compared with a case in which only the reflection type liquid-crystal device 51 was provided, in a case where the transparent and spread illuminating apparatus 1 of the present invention was disposed on the observation face F, although the slight deterioration of luminance was confirmed, such deterioration of luminance as that extent causes no problem in practical use. Also it was confirmed that the illumination of the screen using the ambient light was not impeded even in a case where the transparent and spread illuminating apparatus 1 was attached.

Further, in the case where the luminance was measured in an extremely bright environment such as the ambient light 1500 lx, as is apparent from FIG. 9, the luminance is about 300 cd/m². As described above, in the case where the light source lamp 4 in the transparent and spread illuminating apparatus of the present invention was turned on in the dark room where the intensity of ambient light is 0, it was confirmed that the display quality of the reflection type liquid-crystal device 51 could be greatly improved because the luminance was 380 cd/m².

As Embodiment 2, the light reflection pattern 10 of the transparent and spread illuminating apparatus 1 of the present invention was formed in a pattern different from that in Embodiment 1.

The light reflection pattern 10 is designed in such a manner that, as shown in FIG. 5, the grooves 11 are formed in triangle in section, a portion corresponding to an angle of the apex of the groove 11, that is, a valley portion is formed constantly at 60°, and the angle of inclination α is set so as to be continuously changed in a range of from 45° to 50° from the light source lamp 4 side toward the side end surface 6 in accordance with which the angle of inclination β is also changed (The angles of inclination are set as Embodiment 1).

Then, the pitches of the grooves 11 are always set at 0.5 mm, and the width of the grooves 11 is continuously changed in a range of from 0.01 mm to 0.1 mm from the light source lamp 4 toward the side end surface 6, to thereby change the relative ratio in width of the grooves 11 to the flat portions 12 in accordance with a distance from the light source lamp 4.

The other structures are identical with those in Embodiment 1.

In the transparent and spread illuminating apparatus thus structured, the luminance and illumination were measured in the same conditions as those in Embodiment 1. The results were the same as those in Embodiment 1.

In addition, as Embodiment 3, the transparent substrate 2' of the transparent and spread illuminating apparatus 1 of the present invention, which is different in configuration from that in Embodiment 1, is prepared.

In other words, as shown in FIG. 6, a wedge-shaped transparent acrylic resin plate (size: 240 mm×160 mm, the thickness is continuously changed in a range of from 3 mm to 1 mm) is used as the transparent substrate 2'.

The other structures are identical with those in Embodiment 1.

In the transparent and spread illuminating apparatus thus structured, the luminance and illumination were measured in the same conditions as those in Embodiment 1. The results were substantially the same as those in Embodiment 1. From the above measurement result, the angle of inclination α is preferably 45° to 50°, however, there is no problem in practical use in the case where the above angle is about 35° to 55°.

As was described above, according to the first aspect of the present invention, the illuminating apparatus disposed so as to cover a surface of the member to be illuminated is structured in such a manner that a light source lamp is disposed closely along at least one side end surface of a transparent substrate made of a translucent material, a large number of grooves which are substantially triangular in section are formed on the front surface of the transparent substrate in parallel with an axial direction of the light source lamp to provide a light reflection pattern, and the amount of light caused by the reflection at said grooves and the amount of light depending on a distance from the light source lamp are adapted to be combined to become equal everywhere on the entire back surface of the transparent substrate. With this structure, the light emitted from the light source lamp may progress in the transparent substrate and also go out from the back surface and enter the member to be illuminated, thus being capable of illuminating a screen therewith. Also, since the transparent substrate is made of translucent material, an image can be observed even in the case where the transparent substrate is disposed so as to cover the surface of the member to be illuminated, and such a structure is conveniently portable since the transparent substrate is integrated with the member to be illuminated.

According to the second aspect of the present invention, since the member to be illuminated is made of a reflection type liquid-crystal display device, an image can be illuminated more clearly by turning on the light source lamp of the transparent and spread illuminating apparatus of the present invention in the case where the ambient light is insufficient.

According to the third aspect of the present invention, the light reflection pattern is designed in such a manner that the ratio in width of the grooves and the flat portions becomes larger as the position of the grooves to be formed is separated from the light source lamp when the depths of the respective grooves are constant, and the depths of the grooves become deeper as the grooves are apart from the light source lamp when the widths of the flat portions are constant, or the light reflection pattern is formed by combining the above with each other. As a result, the amount of light caused by the reflection at the grooves and the amount of light depending on a distance from the light source lamp can be adapted to be combined to become constant everywhere on the entire back surface of the transparent substrate, and the machining is relatively easy.

According to the fourth aspect of the present invention, the light reflection pattern is formed in such a manner that the widths of the grooves are 1.5 times as large as the widths of the flat portions, or less. Therefore, this causes no impedance to the illumination of the observation face using the ambient light in the reflection type liquid-crystal display device. As a result, since the screen can be observed in a state where the light source lamp is turned off in an environment when the surroundings are bright and the ambient light is sufficient, a low electric power consumption can be realized.

According to the fifth aspect of the present invention, since the grooves are formed in such a manner that an angle of inclination of one inclined face of the grooves which is closer to the light source lamp is set at 35° to 55°, and an angle of inclination of the other inclined face of the grooves which is opposite to the one inclined face is set at 60° to 90°. As a result, a large number of light entering the grooves can go out from the back surface, leading to a high efficiency.

According to the sixth aspect of the present invention, since the grooves are formed in such a manner that the angles of valley portions which correspond to the angles of the apex of the grooves which are triangular in section are constant, the grooves can be machined by cutting with diamond turning tool, thereby making the manufacture easy.

According to the seventh aspect of the present invention, since the intensity of light emission from said light source lamp is adjustable, the power consumption can be reduced by adjusting the intensity of emission of the light source lamp in accordance with the amount of the ambient light.

The foregoing description of the preferred embodiments of the invention has been presented for purposes of illustration and description. It is not intended to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A transparent and spread illuminating apparatus which is an illuminating apparatus disposed closely to a member to be illuminated so as to cover a front surface of the member to be illuminated, characterized in that:

a light source lamp is disposed closely along at least one side end surface of a transparent substrate made of a translucent material;

a large number of parallel grooves on the front surface of the transparent substrate, which are substantially triangular in section, are separated by flat portions in such a manner that a width of the grooves are 1.5 times as large as a width of the flat portions, or less, and are formed on the surface of said transparent substrate in an axial direction to said light source lamp to provide a light reflection pattern; and said grooves are defined in such a manner that the combined amount of light being caused by the reflection at said grooves and depending on a distance from said light source lamp become identical everywhere on the back surface of said transparent substrate.

2. A transparent and spread illuminating apparatus as claimed in claim 1, wherein said member to be illuminated comprises a reflection type liquid-crystal display device.

3. A transparent and spread illuminating apparatus as claimed in claim 1, wherein said grooves are formed in such a manner that an angle of inclination of a first inclined face of each of the grooves which is closer to the light source lamp is set at 35° to 55°, and an angle of inclination of a second inclined face of each of the grooves which is opposite to said first inclined face is set at 60° to 90°.

4. A transparent and spread illuminating apparatus as claimed in claim 1, wherein said grooves are formed in such a manner that the angles of valley portions which correspond to the angles of the apex of the grooves, which are triangular in section, are constant.

5. A transparent and spread illuminating apparatus as claimed in claim 1, wherein the intensity of light emission from said light source lamp is adjustable.

6. A transparent and spread illuminating apparatus as claimed in claim 1, wherein said light reflection pattern is designed so that a ratio of the width of said grooves to said flat portions along the surface of said transparent substrate becomes greater with the distance from said grooves to the light source lamp, and where the depth of grooves is constant.

7. A transparent and spread illumination apparatus as claimed in claim 1, wherein said light reflection pattern is designed so that the depths of said grooves become deeper with greater distance from the light source lamp, and where the widths of said flat portions are constant.

8. A transparent and spread illuminating apparatus as claimed in claim 1, wherein said light reflection pattern is designed so that said grooves are parallel to the axis of the light source lamp.

* * * * *